Jan. 24, 1961  F. M. SIPTROTT  2,969,040
AUTOMATED EGG-PRODUCING HENHOUSE
Filed Aug. 10, 1959  2 Sheets-Sheet 1
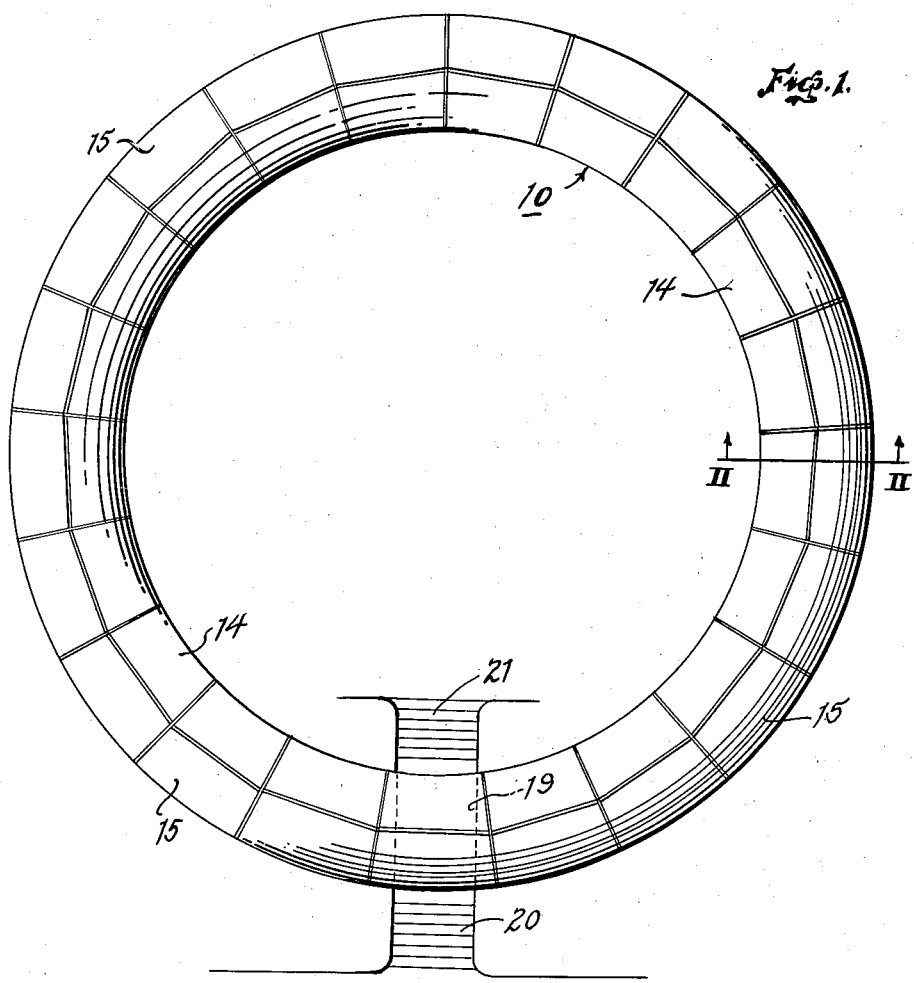
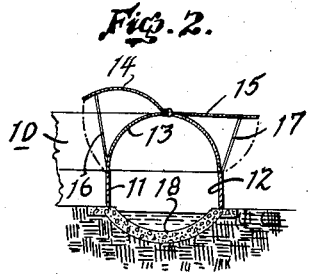
INVENTOR.
FRED M. SIPTROTT.
BY
ATTORNEY Jan. 24, 1961   F. M. SIPTROTT   2,969,040
AUTOMATED EGG-PRODUCING HENHOUSE
Filed Aug. 10, 1959                 2 Sheets-Sheet 2
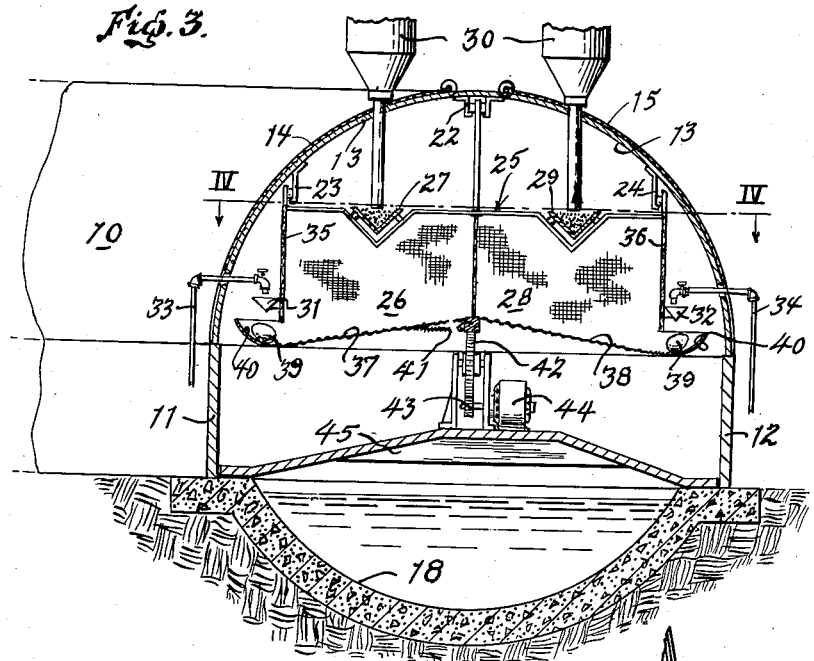
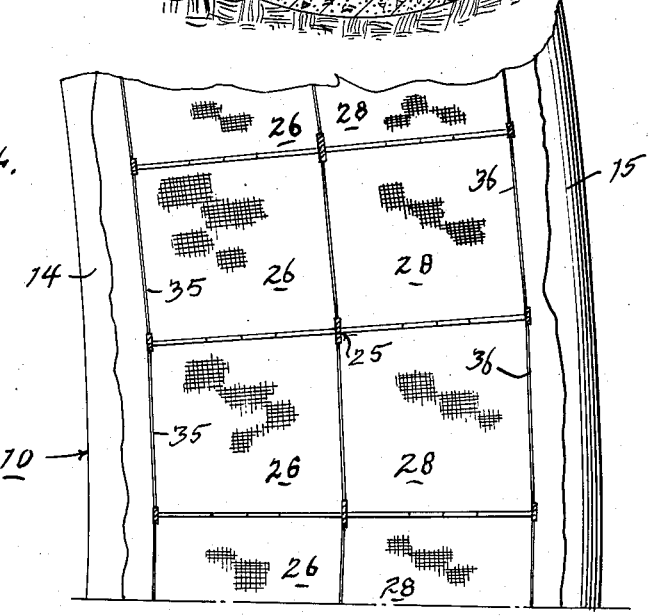
INVENTOR.
FRED M. SIPTROTT,
BY
ATTORNEY

United States Patent Office 2,969,040
Patented Jan. 24, 1961

2,969,040

AUTOMATED EGG-PRODUCING HENHOUSE

Fred M. Siptrott, 5326 Fulton Road, Santa Rosa, Calif.

Filed Aug. 10, 1959, Ser. No. 832,565

3 Claims. (Cl. 119—21)

My present invention relates to the poultry business and more particularly to a henhouse of automated character by which the labor and costs in the production of eggs for the market are reduced to a minimum.

The principal object of the invention is to provide a henhouse in which a large number of egg-laying hens are confined in separate cages that move in a continuous circular path, with a common feed and water trough attached thereto and supplied from a common source of supply and in which the hen droppings are collected in a stationary septic trough extending along and beneath the path of said cages and for the disposal and/or recovery of values contained in said dropping.

Another object of the invention is to provide an annular form of henhouse having spaced concentric side walls in which hen accommodating cages are arranged to move in a circle between the side walls thereof, whereby the introduction of feed and water and the collection of eggs from said cages may be attended to at a common feed introducing and egg collecting station externally of the henhouse.

A further object of the invention is to provide a henhouse having novel construction with open bottom cages in which individual hens are confined and carried in a circular path over a septic trough of annular form where the droppings are collected and disposed of in an efficient, continuous and sanitary manner.

Other objects and advantages would be in part evident to those skilled in the art and in part pointed out hereinafter in the following description taken in connection with the accompanying drawings wherein:

Figure 1 is a plan view showing in outline the general configuration of my improved henhouse, Figure 2 is a diagrammatic sectional view taken along line II—II of Figure 1 showing features of the roof, Figure 3 is a larger fragmentary sectional view showing the interior details of construction as employed in the henhouse of Figure 1, and Figure 4 is a fragmentary view taken along line IV—IV of Figure 3, with the roof broken away, showing the arrangement of hen accommodating cages.

In the production of eggs for the market, the poultryman is not only concerned with the health of his flock of hens, but also the cost of labor and with this, when confronted with the increasing cost of feed, which is beyond the control of the poultryman, resort must be had to other practical expedients for reducing expenses. It is therefore a final object of my invention to produce a henhouse in which a large number of hens may be conveniently and efficiently taken care of with a minimum of help and at the same time provide sanitary conditions that will not only maintain the hens in a healthy condition but also increase their egg-laying potential.

In Figures 1 and 2 of the drawings, I have shown in broad outline the general character of a hen house constructed in accordance with a preferred embodiment of the invention. In these showings, the numeral 10 designates generally the nature and form of the henhouse which as herein indicated will be in the form of a continuous circle. The enclosure as indicated in Figure 2 is in cross-section somewhat comparable to a quonset hut in that the housing has circular walls 11 and 12 which are spaced apart and extend concentrically with the wall 11 innermost. These walls 10 and 11 support a roof-carrying frame 13 upon which there may be hinged cover or roof forming members 14 and 15, at the sides of a ridge beam that is a part of the roof supporting frame 13. As here indicated the roof-closing members 14 are permanently curved to conform with the curvature of the frame 13 and when opened they will be supported by struts or stays 16. As an alternative, I may form the roof-forming members 14 and 15 of a flexible material, either metal or fabric, that can be wrapped downwardly over the sides of the framework 13 where they may be secured to the walls 11 or 12 and when opened they may be supported by struts 16 and 17. It will be noted that substantially the entire floor area of the housing 10 consists of a trough or septic tank 18 into which hen droppings will collect for disposal in a septic manner. In order to provide for access to the inner area as encircled by the henhouse, I provide an underpass 19 with stairways 20 and 21 leading from the outer to the inner enclosed area. With this arrangement, the poultryman will be able to inspect the cages which, as will hereinafter appear, are arranged back to back in two circles. When the inner and outer hinged roof-forming members 14 and 15 are lifted, the cages will be fully ventilated while at the same time the hens will be fully protected from sun and rain.

Reference is now made to Figures 3 and 4 of the drawings for a more detailed description of the cage arrangement and particularly the manner in which feed and water and the collection of eggs is provided for. As here shown, the roof-carrying frame supports a nest supporting trackway 22 at the ridge thereof, and at the sides, there are additional right and left hand circular trackways 23 and 24 between which a rigid circular cage or nest assembly 25 is supported upon suitable rollers for its circular movement. Due to the large diameter of the henhouse the cages 25 which are constructed as a single unit entirely of open mesh wire are of substantially uniform dimensions. Extending over the inner row of cages, designated by the numeral 26, there is a circular trough 27 and arranged in a circle over the outer row of cages 28, there is a similar circular trough 29. These troughs 27 and 29 are carried by the cage assembly and are supplied with feed from two feed containing hoppers 30 that are located at a fixed point above the henhouse. In operation feed will be uniformly distributed throughout the entire length of these troughs as they turn with the cages and since the tops of the hen confining cages 26 and 28 are open, the caged hens may feed at any time from the troughs 27 and 29. The front walls of the cages 26 and 28 are of large mesh wire so that the hens may easily drink from encircling water troughs 31 and 32 which are continuously supplied with fresh water from pipe lines 33 and 34. These front walls, designated by the numerals 35 and 36, of the cages 26 and 28 stop short of cage floors 37 and 38 which are here shown as inclined downwardly towards the front of the cages. As a result the eggs 39 when laid will roll out of the several cages and into receptacles 40 where they may be periodically collected by the poultryman as the cage assembly moves past the collecting station. In order to rotate or move the assembly of cages in its circular path, I have here shown the cage assembly as having an annular rack 41 at its bottom center and meshing with this rack 41, there is a driving gear 42 that is connected through a pinion 43 to an electric motor 44. The motor 44 and this gear drive is here shown as mounted over the septic tank 18 by a spanning beam or supporting arch 45.

When the cages are fully occupied by egg laying hens, it will be seen that each hen will have free access to both feed and water and the eggs as laid will be collectable from the receptacles 40 at the front of the cages. In this particular showing the henhouse is adapted to accommodate forty-two hens but it will be understood that by increasing the diameter thereof or by limiting the space allotted to each hen, it will be possible to increase this number.

While I have, for the sake of celarness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. An automated egg-producing hen house, comprising a hen accommodating cage enclosing structure of annular outline having spaced and concentrically disposed inner and outer sidewalls, a bowed roof structure having a central circular ridge beam, said roof structure having panelled sections hinged at its ridge to said beam adapted and arranged to expose the interior of the cage enclosing structure when lifted, a circular assembly of hen accommodating cages suspended from said roof structure for circular movement between said inner and outer sidewalls of the enclosing structure, motive power means for driving said circular assembly of cages in a continuous manner, and a septic trough of circular outline conforming to the surface of substantially the entire cage area of said henhouse.

2. In an automated egg-producing henhouse, the combination of an annular building structure having concentrically spaced sidewalls supporting a roof frame over a circular area therebetween, an annular assembly of hen accommodating cages, a means for supporting said circular assembly of cages for movement in the circular area between said spaced side-walls, motive power means for continuously driving said cage assembly in its circular movement, a continuous feed trough extending in a circle over all of said hen accommodating cages, means for introducing feed to said troughs while in motion, a continuous water-retaining trough disposed outwardly and accessible from each of said cages, egg-catching shelves extending around the inner and outer sides of said annular assembly of cages, said cages being arranged back to back in two circular rows and having an inclined floor and an opening on the low side thereof to permit the laid eggs to roll out of the cages and onto said shelves.

3. In an automated egg-producing henhouse, the combination of an annular building structure having concentrically spaced sidewalls supporting a roof frame therebetween, an annular assembly of hen accommodating cages arranged in two concentric circles, means for suspending said annular assembly of cages for movement in a circle between said spaced walls, motive power means mounted below said cages for moving said cage assembly in said circle, a continuous annular feed trough extending over all of said hen accommodating cages, means for introducing feed to said troughs while in motion, a continuous water-retaining trough disposed outwardly and accessible from the outermost sides of each of said cages, an egg-catching shelf extending along the inner and outer sides of said assembly of cages, said cages having an inclined floor and being open on the low side thereof to permit hen laid eggs to roll out of the cages and onto said shelf, and a circular putrefaction septic trough having an exposed surface comparable to the dimensions of said hen accommodating cages for disposing of droppings in an effective and sanitary manner.

References Cited in the file of this patent

UNITED STATES PATENTS

| | | |
|---|---|---|
| 2,191,651 | Haesloop | Feb. 27, 1940 |
| 2,257,734 | Cornell | Oct. 7, 1941 |
| 2,369,316 | Scott | Feb. 13, 1945 |
| 2,523,615 | Fell | Sept. 26, 1950 |
| 2,585,698 | Spring | Feb. 12, 1952 |
| 2,735,400 | Stubbs | Feb. 21, 1956 |
| 2,745,380 | Vanes | May 15, 1956 |
| 2,756,721 | Hayes | July 31, 1956 |